US012457393B2

(12) United States Patent
Hammond

(10) Patent No.: US 12,457,393 B2
(45) Date of Patent: Oct. 28, 2025

(54) IMAGE INTENSIFIED AND COLOR SENSOR CAMERA

(71) Applicant: Elbit Systems of America, LLC, Fort Worth, TX (US)

(72) Inventor: John Barnett Hammond, Roanoke, VA (US)

(73) Assignee: Elbit Systems of America, LLC, Fort Worth, TX (US)

( * ) Notice: Subject to any disclaimer, the term of this patent is extended or adjusted under 35 U.S.C. 154(b) by 187 days.

(21) Appl. No.: 18/223,904

(22) Filed: Jul. 19, 2023

(65) Prior Publication Data
US 2025/0030933 A1 Jan. 23, 2025

(51) Int. Cl.
*H04N 23/16* (2023.01)
*H04N 23/55* (2023.01)
*H04N 23/62* (2023.01)
*H04N 25/709* (2023.01)

(52) U.S. Cl.
CPC ............. *H04N 23/16* (2023.01); *H04N 23/55* (2023.01); *H04N 23/62* (2023.01); *H04N 25/709* (2023.01)

(58) Field of Classification Search
CPC ........ H04N 23/75; H04N 23/45; H04N 23/62; H04N 23/55; H04N 23/16; H04N 25/709; G02B 27/1066; G03B 17/17; G03B 33/12
See application file for complete search history.

(56) References Cited

U.S. PATENT DOCUMENTS

| | | | | |
|---|---|---|---|---|
| 2013/0100332 A1* | 4/2013 | Kim | ....................... | H04N 23/75 |
| | | | | 348/335 |
| 2013/0342660 A1* | 12/2013 | Iwasaki | .................. | G03B 35/10 |
| | | | | 348/47 |
| 2016/0065940 A1* | 3/2016 | Loong | .................. | H04N 13/207 |
| | | | | 348/47 |
| 2016/0219255 A1* | 7/2016 | Ohmuro | .................. | H04N 23/16 |
| 2021/0314467 A1* | 10/2021 | Kramer | .................. | H04N 23/55 |

* cited by examiner

Primary Examiner — Kelly L Jerabek
(74) Attorney, Agent, or Firm — Spencer Fane, LLP

(57) ABSTRACT

A camera system includes a first imaging sensor, a second imaging sensor, and a controllable mirror system. The mirror system includes a mirror disposed at a fixed position to the first imaging sensor and the second imaging sensor, and a controller to control a signal applied to the mirror. The mirror system transmits a first portion of incident light through the mirror to the first imaging sensor, and reflects a second portion of the light to the second imaging sensor. A method of producing color images includes receiving incident light on a surface of the mirror, controlling the mirror to direct a first portion of the light to a first imaging sensor and a second portion of the light to a second imaging sensor, receiving first imaging sensor data from the first imaging sensor, and receiving second imaging sensor data from the second imaging sensor.

17 Claims, 6 Drawing Sheets

IMAGE INTENSIFIED AND COLOR SENSOR CAMERA

FIELD OF THE INVENTION

Example embodiments in general relate to a camera system for use under both high illumination and low illumination conditions and, more particularly, a camera system to provide color imaging of images obtained under low illumination conditions. The camera system takes advantage of an electronically controllable beam splitter to direct portions of incident light to a first image intensifying sensor and to a second color discriminating sensor.

BACKGROUND

High performance imaging cameras find utility in a number of fields of endeavor. Exemplary uses of such systems may include stationary security systems, heads-up or wearable devices for military applications, or to provide imaging input for additional land-based or air-borne systems. Such imaging cameras may be expected to operate under a variety of illumination conditions from full daylight to two orders of magnitude below starlight. Presently, no single optical sensor can operate across the entire range of illumination conditions.

Many sensors are known that can operate at higher illumination levels, such as CCD and CMOS sensors. Many of such sensors can also provide color discrimination of the incident light. A common color-sensitive sensor may include a CMOS sensor incorporating a Bayer filter to filter incident light into red, green, and blue images on neighboring pixels in the sensor array. However, even the most sensitive of such sensors can only provide adequate image resolution down to about $1 \times 10^{-4}$ foot-candles of illumination.

Alternative sensors are known that can obtain imaging information at much lower illumination levels such as $1 \times 10^{-5}$ foot-candles and below. Non-limiting examples of such low-light imaging sensors may include mage intensifiers or electron-bombarded imagers, and single photon avalanche detectors. In some image intensifier systems, incident light impinges on a photocathode that converts individual light photons to a cascade of electrons. The electron cascade can be focused on a phosphor to convert the electrons to light. The light may then be sensed by an optical sensor and converted into optical data. It may be understood that an image intensifier may saturate at even moderate levels of incident illumination, potentially damaging the intensifier electronics or optics. In general, such image intensifiers are pan-chromatic, meaning that the optical signals produced by the image intensifier do not distinguish color in the incident light.

It is therefore clear that a system for use under a wide range of illumination conditions may rely upon the use of both a high-illumination CMOS or CCD sensor and an image intensifier. Some known systems may relay on multiple apertures, in which light is focused on a high-illumination sensor through a first aperture and a low-illumination sensor through a second aperture. Such system may become bulky due to the multiplicity of optics for the apertures.

Also known are systems having a single aperture in which the incident light is focused on either the high-illumination sensor or the low-illumination sensor. In some of such systems, the light may be steered to the sensors by means of a movable mirror. It may be recognized that the steerable mirror adds complexity and a potential point of failure if the mechanical system to move the mirror gets out of alignment, or is unable to operate. Further, such a system directs light to either the low- or the high-illumination sensors. Therefore, either color images or intensified monochromatic images are obtained.

Therefore, it would be useful to have a wide range illumination camera capable of producing color images even at low illumination intensities that has a small footprint and does not require mechanical systems to focus the incident light on the sensors.

SUMMARY

In one aspect, a camera system includes a first optical imaging sensor, a second optical imaging sensor, and an electronically controllable mirror system. The electronically controllable mirror system includes an electronically controllable mirror disposed at a fixed position relative to the first optical imaging sensor and to the second optical imaging sensor, and a mirror controller to control a mirror control signal applied to the electronically controllable mirror. The electronically controllable mirror system, based on the mirror control signal, transmits a first portion of incident light through the electronically controllable mirror to the first optical imaging sensor, and reflects a second portion of the incident light by the electronically controllable mirror to the second optical imaging sensor.

In one aspect, the camera system further includes a camera system controller. The camera system is composed of a processor and a memory unit. The memory unit includes instructions that, when executed by the processor, cause the processor to receive first optical imaging sensor data from the first optical imaging sensor and receive second optical imaging sensor data from the second optical imaging sensor.

In one aspect, the camera system includes instructions that, when executed by the processor, further cause the processor to calculate imaging data from characteristics of the first optical imaging sensor data and characteristics of the second optical imaging sensor data.

In one aspect, the camera system includes instructions that, when executed by the processor, further cause the processor to transmit the imaging data to an image display system, a data storage system, or an external system.

In one aspect, the camera system includes instructions that, when executed by the processor, further cause the processor to transmit a mirror controller regulator signal to the mirror controller based at least in part on the first optical imaging sensor data or the second optical imaging sensor data.

In one aspect, the camera system includes instructions that, when executed by the processor, further causes the processor to receive a manual operation signal from a user-operated input device and transmit a manual mirror controller regulator signal to the mirror controller.

In one aspect, the camera system includes instructions that, when executed by the processor, further causes the processor to receive an input signal from an external device and transmit an input data mirror controller regulator signal to the mirror controller.

In one aspect of the camera system, the first optical imaging sensor is an intensified imaging sensor.

In one aspect of the camera system, the second optical imaging sensor is a color imaging sensor.

In one aspect of the camera system, the electronically controllable mirror includes a surface spatially fixed with respect to a body of the electronically controllable mirror to receive the incident light.

In one aspect of the camera system, the electronically controllable mirror is continuously adjustable between a maximum percent transmittance state and a minimum percent transmittance state, and the electronically controllable mirror is continuously adjustable between a maximum percent reflectance state and a minimum percent reflectance state.

In one aspect of the camera system, the mirror control signal is continuously variable between a mirror control signal value corresponding to the minimum percent transmittance state and a mirror control signal value corresponding to the maximum percent transmittance state.

In one aspect of the camera system, the mirror control signal is continuously variable between a mirror control signal value corresponding to the minimum percent reflectance state and a mirror control signal value corresponding to the maximum percent reflectance state.

In one aspect of the camera system, the mirror control signal is composed of a mirror control voltage.

In one aspect, a method of producing color images include receiving incident light on a surface of an electronically controllable mirror, controlling, by a camera system controller, the electronically controllable mirror to direct a first portion of the incident light to impinge on a first optical imaging sensor and to direct a second portion of the incident light to impinge on a second optical imaging sensor, receiving, by the camera system controller, first optical imaging sensor data from the first optical imaging sensor, and receiving, by the camera system controller, second optical imaging sensor data from the second optical imaging sensor. According to the aspect, the electronically controllable mirror is disposed at a fixed position relative to the first optical imaging sensor and to the second optical imaging sensor, and the surface of the electronically controllable mirror is spatially fixed with respect to a body of the electronically controllable mirror.

In one aspect of the method, controlling, by the camera system controller, the electronically controllable mirror includes controlling the electronically controllable mirror based at least in part on the first optical imaging sensor data or the second optical imaging sensor data.

In one aspect, the method further includes calculating, by the camera system controller, imaging data from the first optical imaging sensor data and the second optical imaging sensor data. According to the aspect, the imaging data includes characteristics of the first optical imaging sensor data and characteristics of the second optical imaging sensor data.

In one aspect, the method further includes transmitting, by the camera system controller, the imaging data to an image display system, an image data storage system, or an external device.

In one aspect, the method further includes receiving, by the camera system controller, a manual operation signal from a user-operated input device and controlling, by the camera system controller, the electronically controllable mirror based at least in part on the manual operation signal.

In one aspect, the method further includes receiving, by the camera system controller, an input signal from an external device and controlling, by the camera system controller, the electronically controllable mirror based at least in part on the input signal from the external device.

BRIEF DESCRIPTION OF THE DRAWINGS

Examples of the present disclosure are best understood from the following detailed description when read in connection with the accompanying drawings. According to common practice, the various features of the drawings are not drawn to scale, or are only shown in partial perspective. The dimensions of the various embodiments are shown arbitrarily expanded or reduced for clarity. Like numerals are used to represent like elements among the drawings. Included in the drawings are the following features and elements, and reference will now be made to each drawing in which.

DETAILED DESCRIPTION

Figure 1:
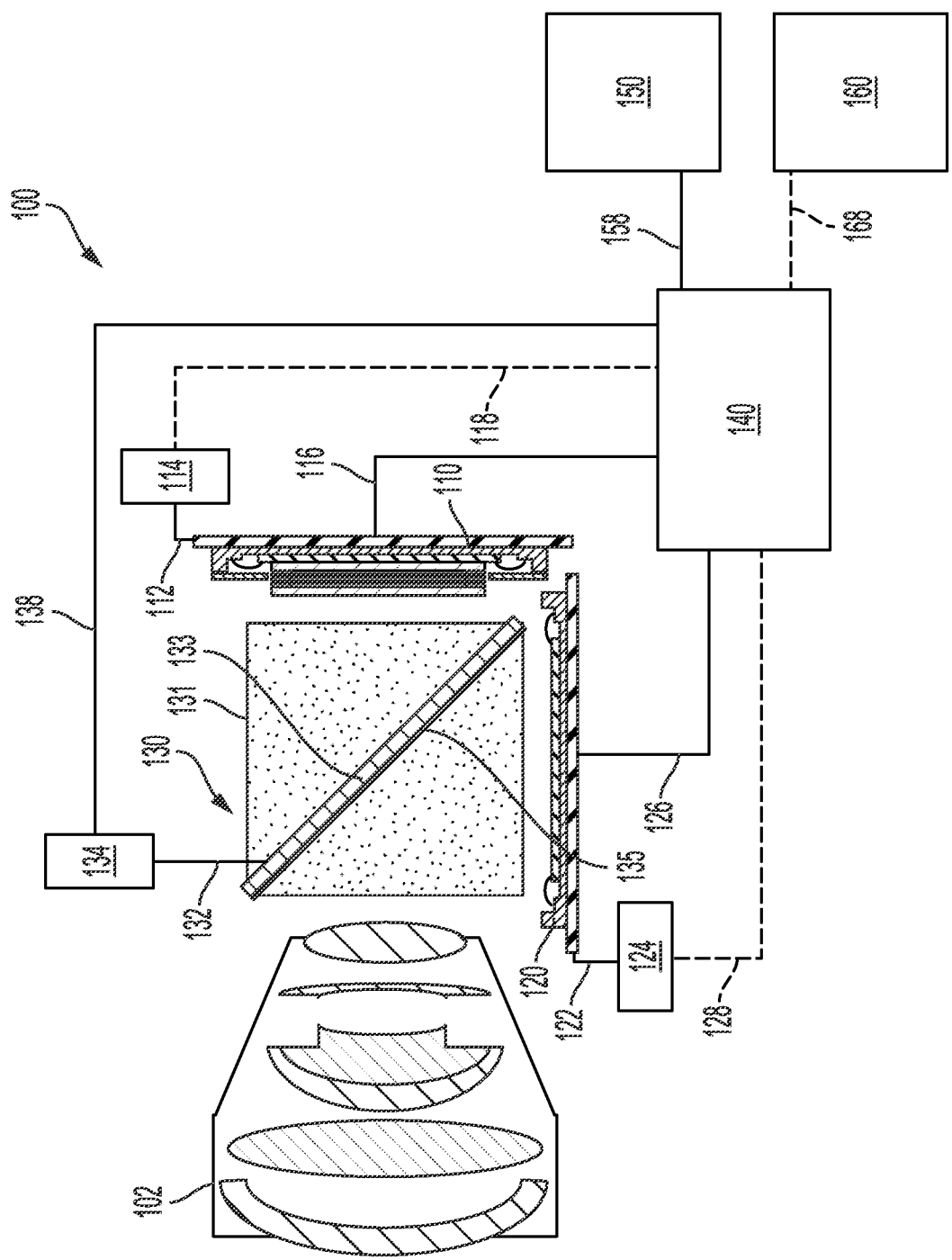
FIG. 1 is a partial block diagram of a camera system having a color imaging sensor and an image intensifying sensor, according to one aspect of the present disclosure.

The following discussion is directed to various aspects of the devices and methods of the present disclosure. However, one of ordinary skill in the art will understand that the examples disclosed herein have broad application, and that the discussion of any aspect is meant only to be exemplary of that aspect, and not intended to suggest that the scope of the disclosure, including the claims, is limited to that aspect.

As noted above, the drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., x, y or z direction or central axis of a body, outlet or port), while the terms "radial" and "radially" generally mean perpendicular to the given axis. For instance, an axial distance refers to a distance measured along or parallel to the axis, and a radial distance means a distance measured perpendicular to the axis.

As discussed above, a user of a camera system may prefer to obtain color images to better analyze the images in terms of content. A camera operating under high illumination conditions may take advantage of a color imaging sensor to provide such color images. However, imaging sensors that can operate under low or very low illumination conditions typically provide only monochromatic images and are not capable of providing color images. The system disclosed herein takes advantage of imaging data obtained from both color imaging sensors and intensified imaging sensors. Data from the two types of imagining sensors can be merged into a single image under low illumination conditions in which the color imaging sensor data may not be optimal.

Referring now to FIG. 1, a partial block diagram of a camera system 100 having a color imaging sensor and an image intensifying sensor is depicted. While color imaging sensors and image intensifying sensors are discussed below, it may be understood that the camera system disclosed herein may use any group of imaging sensors having different illumination responses. Camera system 100 includes imaging optics 102, a first optical imaging sensor 110, a second optical imaging sensor 120, an electronically controllable mirror system 130, and electronic components to control the system. Additional components may be included to display imaging data on an image display system 150, and store imaging data in an image data storage system 160, or to direct imaging data to an external device for processing or automated camera system control.

Imaging optics 102 may include any optical components to focus, filter, collimate, and otherwise control the light through the aperture before being directed to optical imaging sensors 110, 120. Imaging optics 102 may form part of a single camera aperture. Exemplary optical components may include objective lenses, relay lenses, filters, polarizers and similar.

First optical imaging sensor 110 may include an intensified imaging sensor. Such a sensor may be capable of providing first optical imaging data under low illumination conditions. Low illumination conditions may be defined, without limitation, as illumination of about $1\times10^{-6}$ foot-candles to about $1\times10^{-3}$ foot-candles. Non-limiting examples of such intensified imaging sensors may include image intensifiers, electron bombarded imagers, image intensifiers bonded to a CMOS imaging sensor, single photon avalanche detectors, and quantum information sensors. In some additional aspects, a narrowband optical filter may be placed on or proximal to an imaging surface of the intensified imaging sensor to provide wavelength based light filtering.

First optical imaging sensor 110 may receive light transmitted through electronically controllable mirror 135. First optical imaging sensor 110 may receive a first sensor control signal from a first sensor controller 114. First sensor controller 114 may supply first optical imaging sensor 110 with the first sensor control signal over a first sensor control line 112. In some aspects, first sensor controller 114 may be controlled by data supplied by a camera system controller 140 (further described below with respect to FIG. 2) over a first sensor controller interface 118. For example, if first optical imaging sensor 110 is an image intensifier based camera system, controller 140 may place the intensified imaging sensor in a state to protect it from accidental exposure to a high optical illumination input. Alternatively, first sensor controller 114 may be a stand-alone device not otherwise controlled by camera system controller 140.

First optical imaging sensor 110 may provide first optical imaging data over a first optical imaging sensor data line 116 to camera system controller 140. First optical imaging data may include, without limitation, one or more image files or image characterization data derived from the one or more images captured by first optical imaging sensor 110. Image characterization data may include, without limitation, a location or locations in the image field of one or more predetermined objects, an outline of one or more objects within the image field, or other data to characterize objects within the image field. The optical imaging data may be obtained through single frames, or can be obtained from multiple frames captured by first optical imaging sensor 110 over time.

First optical imaging sensor 110 may also receive first sensor operational control data over first optical imaging sensor data line 116 from camera system controller 140. The first optical imaging data may be processed by camera system controller 140 as part of a method to produce imaging data for either display, storage, or analysis by an external device.

Second optical imaging sensor 120 may include a CMOS or CCD color imaging sensor. Such a sensor may be capable of providing second optical imaging data under higher illumination conditions. Higher illumination conditions may be defined, without limitation, as about $1\times10^{-3}$ foot-candles to full daylight (which may be about $1\times10^{3}$ foot-candles). Non-limiting examples of such color imaging sensors may include CMOS imaging sensors, charge coupled devices (CCD), and single photon avalanche detectors.

Second optical imaging sensor 120 may include a second active surface to receive light reflected by electronically controllable mirror 135. Second optical imaging sensor 120 may require a second sensor control signal from a second sensor controller 124. Second sensor controller 124 may be configured to supply the second optical imaging sensor with the second sensor control signal over a second sensor control signal conductor 122. In some aspects, second sensor controller 124 may be controlled by data supplied by the camera system controller 140 over a second sensor controller interface 128. For example, if second optical imaging sensor 120 is a color imaging sensor, the second sensor control signal may be initially enabled by camera system controller 140. In this manner, the color imaging sensor may provide second optical imaging data to the camera system controller 140. In one non-limiting example, second optical imaging data may enable the camera system controller 140 to adjust the first sensor control signal if the illumination level impinging on the color imaging sensor is too low. Alternatively, second sensor controller 124 may be a stand-alone device not otherwise controlled by the camera system controller 140.

Second optical imaging sensor 120 may provide second optical imaging data over a second optical imaging sensor data line 126 to the camera system controller 140. Second optical imaging data may include, without limitation, one or more image files or image characterization data derived from the one or more images captured by second optical imaging sensor 120. Image characterization data may include, without limitation, a location or locations in the image field of one or more predetermined objects, an outline of one or more objects within the image field, or other data to characterize objects within the image field. The optical imaging data may be obtained through single frames, or can be obtained from multiple frames captured by first optical imaging sensor 120 over time.

Second optical imaging sensor 120 may also receive second sensor operational control data over second optical imaging sensor data line 126 from camera system controller 140. The second optical imaging data may be processed by camera system controller 140 as part of a method to produce imaging data for either display, storage, or analysis by an ancillary device.

Although FIG. 1 and the disclosure above suggest that first optical imaging sensor 110 may include an intensified imaging sensor, and that second optical imaging sensor 120 may include a CCD or CMOS color sensor, it may be recognized that first optical imaging sensor 110 and second optical imaging sensor 120 may alternatively include a CCD or CMOS color sensor and an intensified imaging sensor, respectively. Further, first optical imaging sensor 110 and second optical imaging sensor 120 may include alternative optical imaging sensors, for example IR sensitive imaging sensors and/or UV sensitive imaging sensors. Additionally, first optical imaging sensor 110 and second optical imaging sensor 120 may include various coatings such as polarization coatings and/or non-reflective coatings.

Again, with reference to FIG. 1, electronically controllable mirror system 130 may include an electronically controllable mirror 135 mounted on a transparent mirror mounting 133. The amount of light reflected by or transmitted through electronically controllable mirror 135 may be controlled by a mirror control signal provided by a mirror controller. In some aspects, the mirror control signal may be a mirror control voltage. Non-limiting examples of the mirror control voltage may include a DC analog voltage or an AC analog voltage. In one non-limiting example, an AC analog voltage may be a 100-260V 20 Hz square wave signal. Alternative examples of an AC analog voltage control signal may include a variable pulse frequency control signal or a variable pulse phase control signal. Alternatively, the mirror control signal may be a mirror control current. Non-limiting examples of the mirror control current may include a DC analog current or an AC analog current. In some non-limiting aspects, an AC current control signal may include a variable pulse frequency control signal or a variable pulse phase control signal. In yet another alternative example, a mirror control signal may be a digital control signal having characteristics of any appropriate digital signal format. Non-limiting examples of digital mirror control signals may include serial encoded digital control signals or parallel control signals. Although electronically controllable mirror 135 is described below in terms of a control by a voltage, for example a DC voltage (see FIG. 3 and the discussion, below), it may be understood that any of the alternative electronic control signals, including analog voltages or currents, or digital control signals, may equally apply.

Electronically controllable mirror 135 and transparent mirror mounting 133 may be mounted within a mirror support 131. Mirror support 131 may function to maintain a fixed and constant position and orientation of electronically controllable mirror 135 with respect to the active optical surfaces of first optical imaging sensor 110 and second optical imaging sensor 120. In some aspects, electronically controllable mirror 135 may have a surface to receive incident light and to reflect, transmit, or both reflect and transmit a portion of the incident light to first optical imaging sensor 110 and/or second optical imaging sensor 120. Additionally, the reflective or transmissive surface of electronically controllable mirror 135 may be spatially fixed with respect to a body of electronically controllable mirror 135 or transparent mirror mounting 133. Mirror support 131 may be composed of any appropriate structure or material to allow light passing through imaging optics 102 to impinge on a receiving surface of electronically controllable mirror 135. Mirror support 131 may be composed of any appropriate structure or material to further allow light transmitted through electronically controllable mirror 135 to impinge on a first active surface of first optical imaging sensor 110 or light reflected by electronically controllable mirror 135 to impinge on a second active surface of second optical imaging sensor 120. For example, mirror support 131 may be composed of a solid, light transparent material in which electronically controllable mirror 135 and transparent mirror mounting 133 may be imbedded. An additional mechanical support may be used to fix the position and orientation of mirror support 131 within camera system 100.

In some further aspects, electronically controllable mirror 135 may also possess additional optical properties. Such optical properties may include optical filtering properties. For example, electronically controllable mirror 135 may optically filter the light transmitted therethrough or the light reflected therefrom. The optical filtering functions may include, without limitation, optical high pass filtering, optical low pass filtering, optical band pass filtering, or optical notch filtering.

An amount of light impinging on electronically controllable mirror 135 that is transmitted through or reflected from electronically controllable mirror 135 may be determined by a mirror control signal applied to electronically controllable mirror 135. As disclosed above, although the mirror control signal may be described in terms of a control voltage signal (see FIG. 3, below), alternative mirror control signals may be applied, including analog voltages or currents, or digital control signals. The mirror control signal applied to electronically controllable mirror 135 may be sourced by a mirror controller 134 over a mirror control signal conductor 132. The percent transmittance and percent reflectance of light impinging on electronically controllable mirror 135 may be a monotonic function of the mirror control signal applied to electronically controllable mirror 135. Additional details concerning the transmittance/reflectance response of electronically controllable mirror 135 is further discussed below with respect to FIG. 3.

In one aspect, the mirror control signal supplied by mirror controller 134 may be controlled by a mirror controller regulator signal received from camera system controller 140 over a mirror controller regulator interface 138. In one aspect, camera system controller 140 may automatically control the mirror control signal applied to electronically controllable mirror 135 based on a signal received from first optical imaging sensor 110 and/or second optical imaging sensor 120. Alternatively, camera system controller 140 may automatically control the mirror control signal applied to electronically controllable mirror 135 based on a signal received from an additional optical sensor. In a second aspect, camera system controller 140 may transmit a manual mirror controller regulator signal to control the mirror control signal applied to electronically controllable mirror 135 based on a manual operation signal received from a user-operated input device. In one example, the user-operated input device may be in data communication with an input interface of camera system controller 140. In a third aspect, a manual operation signal received from a user-operated input device may control mirror controller 134 directly, and not through camera system controller 140.

Images derived from the imaging data calculated by camera system controller 140 based on the first optical imaging sensor data and the second optical imaging sensor data may be displayed on image display system 150. The imaging data may be in any suitable format for display. Non-limiting formats may include grayscale, RGB, CMYK, HSI, YCbCr, or other suitable format. The imaging data may be transmitted to image display system 150 via a display system interface 158. Display system interface 158 may include any suitable format for the transmission of imaging data, including wired (such as Ethernet, FireWire, SCSI, MIPI, or USB, as non-limiting examples) or wireless formats (such as WiFi or Bluetooth® formats, as non-limiting examples).

The imaging data calculated by camera system controller 140 may also be transmitted over an imaging data interface 168 for use by one or more image data storage systems 160. Imaging data interface 168 may include any suitable format for the transmission of imaging data, including wired (such as Ethernet, FireWire, SCSI, MIPI, or USB, as non-limiting examples) or wireless formats (such as WiFi, telecom, or Bluetooth® formats, as non-limiting examples). Image data storage systems 160 may include local data storage systems (including removable storage media, such as a thumb drive, or fixed storage media, such as fixed hard drives). Image data storage systems 160 may also include remote data storage systems, for example cloud-based data storage systems. Image data storage systems 160 may be used to archive the imaging data over time. In some aspects, the imaging data stored in image data storage systems 160 may be post-processed to include image enhancement, object recognition, or other manipulations of the imaging data. In some additional aspects, the imaging data stored in image data storage systems 160 may be used by external systems, such as airborne or terrestrial moving systems. It may be understood that camera system controller 140 may communicate the imaging data directly to such external systems. As disclosed above, imaging data may include, without limitation, one or more image files or image characterization data derived from the one or more images captured by the optical imaging sensors. Image characterization data may include, without limitation, scene and small area brightness, a location or locations in the image field of one or more predetermined objects, an outline of one or more objects within the image field, or other data to characterize objects within the image field. The optical imaging data may be obtained through single frames, or can be obtained from multiple frames captured by the optical imaging sensors over time.

Figure 2:
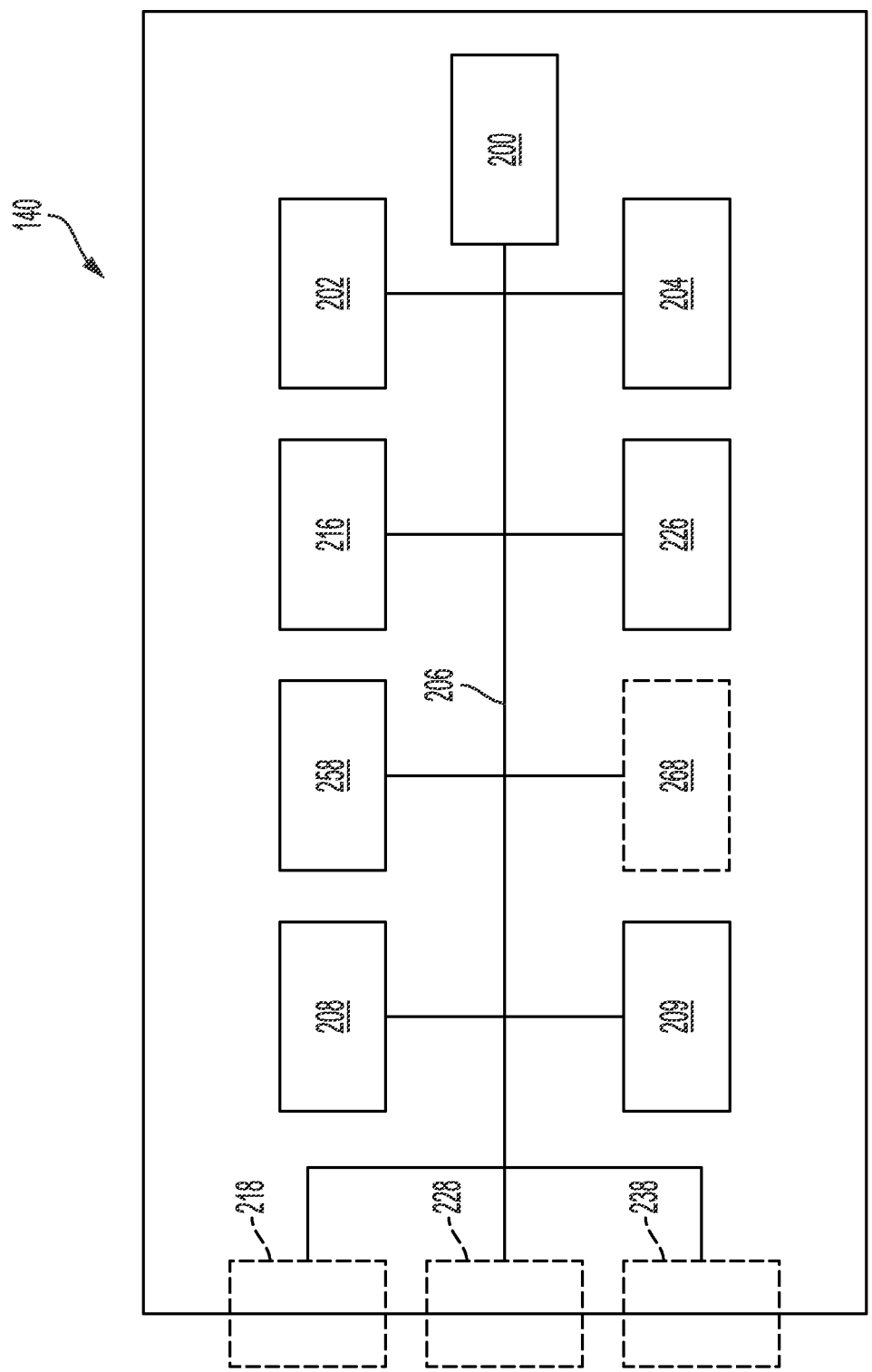
FIG. 2 is a block diagram of a computing system used in the camera system of FIG. 1, according to one aspect of the present disclosure.

Referring now to FIG. 2, non-limiting components of camera system controller 140 are illustrated. Camera system controller 140 may include one or more processors 200, memory units 202, 204, device interfaces 209, 208, 216, 226, 258, 268, and camera controller interfaces 218, 228, 238. The various components may be in data communication with each other over a system bus 206. These components are described in more detail below.

One or more processors 200 may include general purpose processors and special purpose processors, such as video processors or hardware accelerators. A general purpose processor may be used, without limitation, for overall control of the camera system 100. In one example, a special purpose processor may be used for on-board image processing. In one aspect, a video processor may be used to create imaging data from the first optical imaging sensor data and the second optical imaging sensor data. In another example, a hardware accelerator may be used for pre-processing the first optical imaging sensor data and the second optical imaging sensor data. In yet another example, a hardware accelerator may be used for post-processing the imaging data. Non-limiting examples of such post-processing may include image enhancement, contrast or color palette adjustment, or identification of specific features within the imaging data.

System bus 206 may include any data bus structure configured to permit directed and bidirectional transmission of data among the various components of camera system controller 140. Non-limiting examples of such data bus structures may include ISA, EISA, MCA, PCI, PCMCIA, and SCSI.

Memory units may include a volatile memory unit 202 (for example, RAM, vRAM, or similar devices) and a non-volatile memory unit 204 (for example a flash-drive, ROM, EPROM, EEPROM, or similar devices). Memory units 202, 204 may include instructions that, when executed by one or more processors 200, will cause the one or more processors 200 to control the various components of camera system controller 140 and/or the various components and systems of camera system 100. Non-limiting examples of such control signals may include: control signals to first sensor controller 114, second sensor controller 124, mirror controller 134, and the first sensor operational control data and second sensor operational control data to control the operations of first optical imaging sensor 110 and second optical imaging sensor 120, respectively. Memory units 202, 204 may also include instructions that, when executed by one or more processors 200, will cause one or more processors 200 to process the first optical imaging sensor data, the second optical imaging sensor data, and the imaging data. Memory units 202, 204 may further include instructions that, when executed by one or more processors 200, will cause one or more processors 200 to control the operations of device interfaces 209, 208, 216, 226, 258, 268, and camera controller interfaces 218, 228, 238. Volatile memory unit 202 may further be used for transient memory storage of data used for processing the first optical imaging sensor data, the second optical imaging sensor data, and the imaging data.

Device interfaces may include first optical imaging sensor interface 216 and second optical imaging sensor interface 226. First optical imaging sensor interface 216 may be configured to receive first optical imaging sensor data from first optical imaging sensor 110 over first optical imaging sensor data line 116. First optical imaging sensor interface 216 may be also configured to transmit first sensor operational control data to first optical imaging sensor 110 over first optical imaging sensor data line 116. First sensor operational control data may include, without limitation, data to control pixel read-out timing, pixel blanking, or other operations of first optical imaging sensor 110. Second optical imaging sensor interface 226 may be configured to receive second optical imaging sensor data from second optical imaging sensor 120 over second optical imaging sensor data line 126. Second optical imaging sensor interface 226 may be also configured to transmit second sensor operational control data to second optical imaging sensor 120 over second optical imaging sensor data line 126. Second sensor operational control data may include, without limitation, data to control pixel read-out timing, pixel blanking, or other operations of second optical imaging sensor 120. It may be understood that first optical imaging sensor interface 216 and second optical imaging sensor interface 226 are merely functionally defined. First optical imaging sensor interface 216 and second optical imaging sensor interface 226 may be composed of separate interface components or may be combined together into a single interface component.

Memory units 202, 204 may include instructions that, when executed by one or more processors 200, may cause one or more processors 200 to combine first optical imaging sensor data and second optical imaging sensor data to form imaging data based on various characteristics of first optical imaging sensor data and second optical imaging sensor data. In this manner, characteristics of images obtained from first optical imaging sensor 110 and second optical imaging sensor 120 may be combined on a pixel-by-pixel basis into a single image characterized by the imaging data. In one non-limiting example, first optical imaging sensor data obtained first optical imaging sensor 110 may comprise pan-chromatic imaging sensor data from an intensified imaging sensor. Such first imaging sensor data may be represented by pixel values providing relative intensities over a gray-scale palette. Further, in this example, second optical imaging sensor data obtained second optical imaging sensor 120 may comprise color imaging sensor data from a CCD or CMOS color imaging sensor. The second (color) imaging sensor data may be in any appropriate format, such as RGB, CMYK, HSI, YCbCr, or other suitable format.

An exemplary method of combining the characteristics of the first optical imaging sensor data and the second optical imaging sensor data may include converting the color format of a raw image based on second optical imaging sensor data to an HSI (hue, saturation, intensity) format. The hue and saturation data may be obtained from the second optical imaging sensor data, while intensity data may be obtained from the first optical imaging sensor data. Alternatively, the intensity data may be obtained from a combination of the first optical imaging sensor data and the second optical imaging sensor data. In this manner, a color image may be calculated under low illumination conditions under which the color imaging sensor does not operate as well as when operated under optimal light capture conditions. It may be recognized that the illumination of the optical imaging sensors may sufficiently low, or very low, so that the second optical imaging sensor produces no useful data. Under such illumination conditions, the imaging data may be based solely on the first optical imaging sensor data. Similarly, if the illumination of the optical imaging sensors sufficiently high, or very high, the first optical imaging sensor may be deliberately disabled to prevent damage, and therefore produce no first optical imaging sensor data. Under such illumination conditions, the imaging data may be based solely on the second optical imaging sensor data.

Device interfaces may also include a user operated input device interface 208 and user output device interface 209. User operated input device interface 208 may receive data from a user of camera system 100. A user operated input device may include, without limitation, a mouse, a touch-screen display, a keyboard, a voice activated device, a stylus, a joystick, a control knob, or any other device that a user may employ to provide an input signal for operation of camera system 100. In one non-limiting aspect, the user may employ a keyboard to enter operational instructions to camera system controller 140 related to the operations of first sensor controller 114, second sensor controller 124, and/or mirror controller 134. In this manner, the user may control the signals to operate first optical imaging sensor 110, second optical imaging sensor 120, or electronically controllable mirror 135. Additionally, the user may specify the percent transmittance and reflectance of electronically controllable mirror 135. The user may further specify operation of first optical imaging sensor 110 and second optical imaging sensor 120, for example setting frame capture rates. The user may further specify the output of imaging data either to image display system 150 or to image data storage system 160.

User output device interface 209 may be used to transmit data to systems or devices employed by the user. In one example, if camera system controller 140 includes instructions to analyze imaging data and identify features therein, camera system controller 140 may provide alarm data via output device interface 209 to a visual or auditory alarm device (for example LED or buzzer) if an untoward feature is detected. Both user operated input device interface 208 and user operated output device interface 209 may interface with a stand alone computing system or embedded computing system. Such computing systems may include, without limitation, a work station, a laptop computer, a tablet computer, or a smart phone. It may be understood that user operated input device interface 208 and user output device interface 209 may be any types of interfaces for their intended purposes, such as serial interfaces, parallel interfaces, optical interfaces, or wireless interfaces, among others. Alternatively, user operated input device interface 208 and user output device interface 209 may be consolidated into a single physical user device interface.

In an alternative aspect, user operated input device interface 208 and user output device interface 209 may be used by an external system for automated use of camera system 100. One non-limiting examples of such an external system may include an autonomous vehicle. In this aspect, an external automated system may receive the imaging data, determine appropriate changes to the function of camera system controller 140, and provide appropriate input signal for operation of camera system 100 via user operated input device interface 208. Input signal may include any data that may control an operation of camera system controller 140 including control of electronically controllable mirror 135. Input signal to the camera system controller 140 may be transmitted as input signal mirror controller regulator signals to mirror controller 134. Similarly, the external automated system may receive alarm data as disclosed above through user output device interface 209. However, it may be well understood that an external automated system may receive alarm data and transmit input signals for operation of camera system 100 via a separate external device input interface and a separate external device output interface. Alternatively, the external automated system may both receive and transmit data to the camera system controller 140 through a combined external device interface.

Device interfaces may further include an image output interface 258 and a data output interface 268. The imaging data may be transmitted to image display system 150 via image output interface 258. Image output interface 258 may be in data communication with display system interface 158. The imaging data may also be transmitted to image data storage system 160 via data output interface 268. Data output interface 268 may be in data communication with imaging data interface 168. Both image output interface 258 and data output interface 268 may have interface characteristics suitable for their respective functions, as disclosed above.

Camera controller interfaces 218, 228, 238 may be used to provide control signals to the relevant optical device controllers. Thus, first sensor controller 114 may be controlled by data supplied by camera system controller 140 through a data connection between first sensor camera controller interface 218 and first sensor controller interface 118. Similarly, second sensor controller 124 may be controlled by data supplied by camera system controller 140 through a data connection between second sensor camera controller interface 228 and second sensor controller interface 128. The data transmitted through first sensor camera controller interface 218 and second sensor camera controller interface 228, for example, may enable or disable signals supplied by first sensor controller 114 and second sensor controller 124 to their respective optical imaging sensors (110 and 120, respectively). Mirror controller interface 238 may transmit mirror control signal data over mirror controller regulator interface 138 to mirror controller 134. The mirror control signal data may direct the mirror controller 134 to supply a signal to electronically controllable mirror 135, thereby controlling the transmittance and/or reflectance of light impinging on electronically controllable mirror 135.

Figure 3:
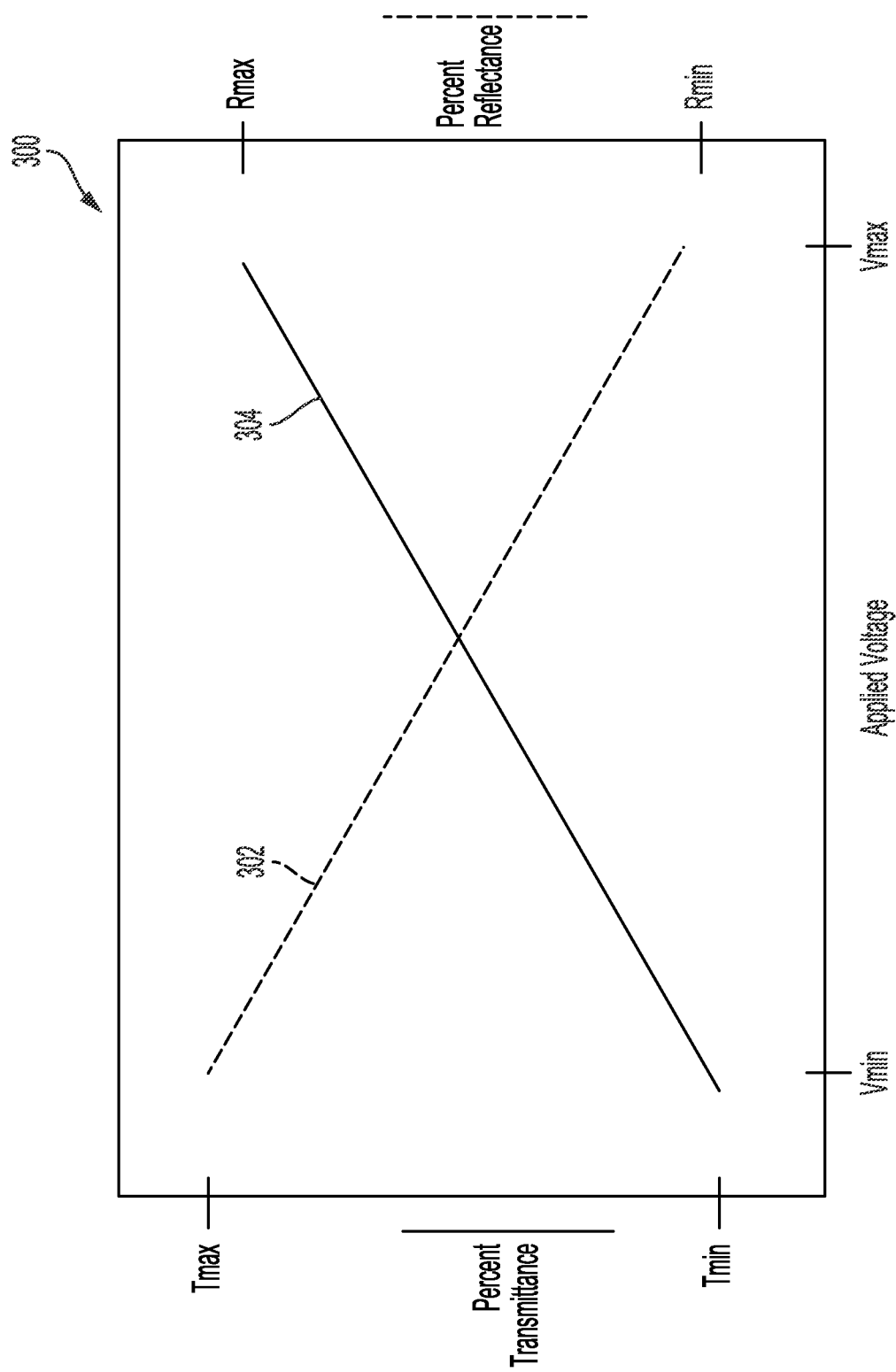
FIG. 3 is an exemplary graph of percent light transmittance and percent light reflectance versus applied mirror control signal of an electronically controllable mirror, according to one aspect of the present disclosure.

Referring now to FIG. 3, FIG. 3 depicts an exemplary graph 300 of percent transmittance and percent reflectance of light incident on electronically controllable mirror 135 as a function of an exemplary mirror control signal applied by mirror controller 134 to electronically controllable mirror 135. Without loss of generality, the exemplary mirror control signal depicted in FIG. 3 is a mirror control voltage. However, it may be understood that FIG. 3 illustrates a response to any mirror control signal that can generate a monotonic response of electronically controllable mirror 135 over the range in values of the mirror control signal. In particular, a percent transmittance response curve 304 is depicted along with a percent reflectance response curve 302. While percent transmittance response curve 304 and percent reflectance response curve 302 are depicted as being linearly dependent on the mirror control voltage applied by mirror controller 134 to electronically controllable mirror 135, it may be understood that alternative percent transmittance response curves and percent reflectance response curves may include any continuously monotonic relationship with respect to the applied mirror control voltage. Thus, for example, percent reflectance response curve 302 has a constant negative slope with respect to the applied mirror control voltage and percent transmittance response curve 304 has a constant positive slope with respect to the applied mirror control voltage. It may be recognized that in some alternative examples, percent reflectance response curve 302 may have a positive slope with respect to the applied mirror control voltage and percent transmittance response curve 304 may have a negative slope with respect to the applied mirror control voltage. In some aspects, alternative percent transmittance response curves and percent reflectance response curves may include plateau regions at the low and/or high end of the respective response curves. It may be recognized that the monotonic portion of the alternative percent transmittance response curves and percent reflectance response curves between such plateau regions may constitute an effective operating zone with respect to a control of electronically controllable mirror 135.

Regardless of the exact shape of percent transmittance response curve 304 and percent reflectance response curve 302, percent transmittance response curve 304 and percent reflectance response curve 302 are both continuous and monotonic with respect to the mirror control voltage applied to electronically controllable mirror 135 throughout their respective effective operating zones. In this manner, both the percent reflectance and percent transmittance of light may be continuously varied across the range of applied voltage. The mirror control voltage range defining the effective operating zone may be defined by a minimum voltage ($V_{min}$) and a maximum voltage ($V_{max}$).

Percent reflectance response curve 302 may vary between a minimum percent reflectance ($R_{min}$) and a maximum percent reflectance ($R_{max}$). In one non-limiting example, a minimum percent reflectance ($R_{min}$) may have a value of about 10% without an anti-reflectance coating or a value of about 3% with an anti-reflectance coating. In one non-limiting example, a maximum percent reflectance ($R_{max}$) may have a value greater than about 87%. Similarly, percent transmittance response curve 304 may vary between a minimum percent transmittance ($T_{min}$) and a maximum percent transmittance ($T_{max}$). In one non-limiting example, a minimum percent transmittance ($T_{min}$) may have a value of less than about 1%. In one non-limiting example, a maximum percent transmittance ($T_{max}$) may have a value greater than about 87% without an anti-reflectance coating or a value greater than about 95% with an anti-reflectance coating. In some additional non-limiting examples, electronically controllable mirror 135 can effectively operate using incident light within a spectral range of about 400 nm to about 5,000 nm. In some alternative non-limiting examples, electronically controllable mirror 135 can effectively operate using incident light within a spectral range of about 500 nm to about 1,000 nm. In some yet additional non-limiting examples, electronically controllable mirror 135 can effectively operate using incident light within a spectral range of about 400 nm to about 1,100 nm. In some further non-limiting examples, the mirror control voltage applied to electronically controllable mirror 135 can be continuously varied between a $V_{max}$ value of about 260V and a $V_{min}$ value of about 100V.

The percent reflectance and percent transmittance of electronically controllable mirror 135 may be readily controlled by an application of a mirror controller regulator signal to mirror controller 134. As discussed above, the mirror controller regulator signal may originate from camera system controller 140. In an automated mode, camera system controller 140 may automatically control the mirror control signal applied to electronically controllable mirror 135 based on a signal received from one or more of first optical imaging sensor 110, second optical imaging sensor 120, or a separate illumination sensor. In one aspect, camera system controller 140 may determine a illumination value of light impinging on all or part of first optical imaging sensor 110, second optical imaging sensor 120, or the separate illumination sensor.

Camera system controller 140 may store data related to operational parameters associated with one or more of first optical imaging sensor 110 or second optical imaging sensor 120. Such data may include an optimal or maximal range of illumination conditions for the operation of the respective optical imaging sensors. Camera system controller 140 may then determine an amount of the total illumination impinging on electronically controllable mirror 135 to be directed to first optical imaging sensor 110 and to second optical imaging sensor 120. In some aspects, camera system controller 140 may include data regarding illumination conditions that may cause first optical imaging sensor 110 to fail or be damaged, such as under high illumination conditions. Under such illumination conditions, mirror controller 134 may receive instructions to source a mirror control signal to place electronically controllable mirror 135 in a condition to direct light away from first optical imaging sensor 110.

Camera system controller 140 may generate the mirror controller regulator signal required to adjust the transmittance and reflectance of electronically controllable mirror 135 to optimize the first optical imaging sensor data and second optical imaging sensor data. Camera system controller 140 may further store data related to percent reflectance response curve 302 and percent transmittance response curve 304 of electronically controllable mirror 135. Such data may be stored in a look-up table or as an analytical expression. Camera system controller 140 may use the response curve data with the look-up table or analytical expression to generate a value of the mirror controller regulator signal for receipt by mirror controller 134. It may be understood that camera system controller 140 may continuously monitor the total illumination impinging on electronically controllable mirror 135 over time, and continuously adjust the mirror controller regulator signal as the total illumination increases (for example during increasing daylight) or decreases (for example during decreasing daylight). It may be recognized that an electronically controllable mirror having a continuous response to the applied mirror control signal is necessary in order for camera system controller 140 to apply continuous adjustment to the reflectance and transmittance of incident illumination to first optical imaging sensor 110 and to second optical imaging sensor 120.

In another example of an automated mode of operation of camera system 100, camera system 100 may be initiated to direct the light impinging on electronically controllable mirror 135 to a CMOS or CCD color imaging sensor (either first optical imaging sensor 110 or second optical imaging sensor 120). In this manner, the image intensifying sensor may not be exposed to high illumination light on initialization. Camera system controller 140 may determine if the light impinging on the color imaging sensor is below an operational threshold of the color imaging sensor and automatically adjust the mirror controller regulator signal to direct an amount of the incident light to the image intensifying sensor.

In an alternative aspect, the mirror controller regulator signal may originate from a manual operation signal controlled by a user of camera system 100. The mirror controller regulator signal may be transmitted directly to mirror controller 134 or may be transmitted to camera system controller 140 over user operated input device interface 208. The manual operation signal may be limited to a finite number of control values (for example through user actuated switches) or may be continuously variable over a range of values. In another aspect, the manual operation signal transmitted to camera system controller 140 over user operated input device interface 208 may be combined with the mirror controller regulator signal generated by the camera system controller 140. In this manner, the user may be able to manually adjust or over-ride the mirror controller regulator signal generated by the camera system controller 140.

Figure 4:
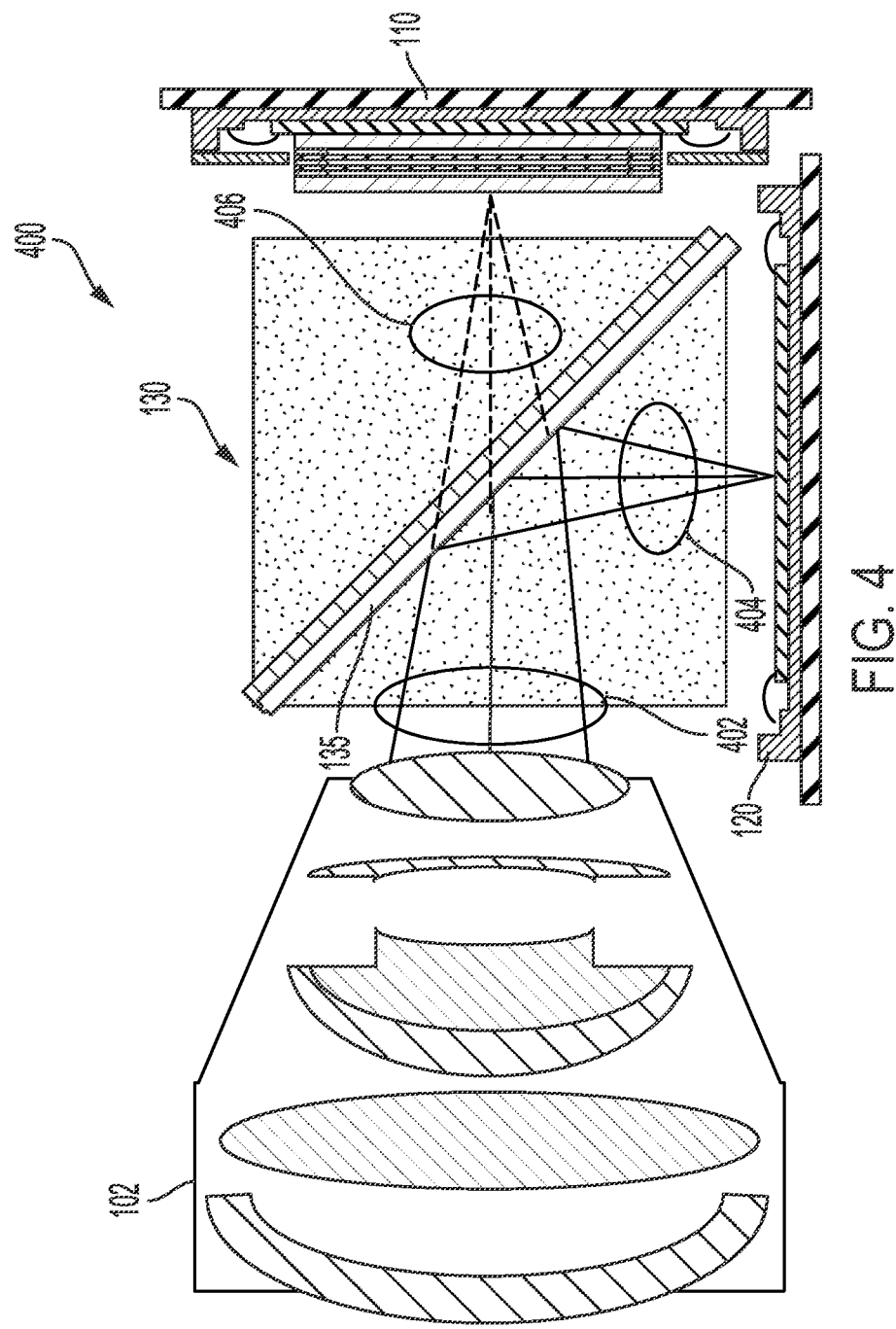
FIG. 4 is a partial block diagram of a camera system having a color imaging sensor and an image intensifying sensor operating under maximal reflectance conditions, according to one aspect of the present disclosure.
Figure 5:
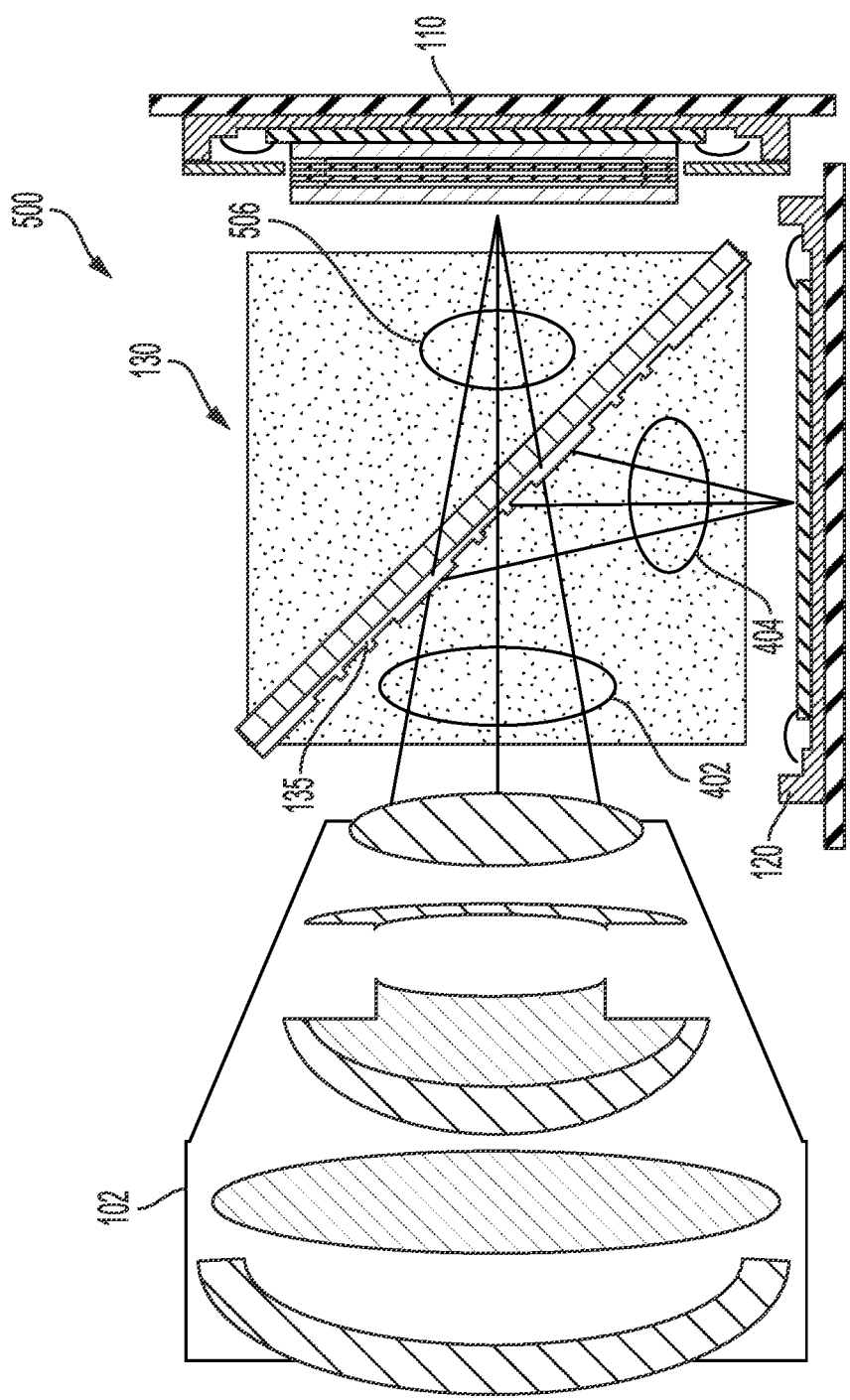
FIG. 5 is a partial block diagram of a camera system having a color imaging sensor and an image intensifying sensor operating under mixed reflectance and transmittance conditions, according to one aspect of the present disclosure.
Figure 6:
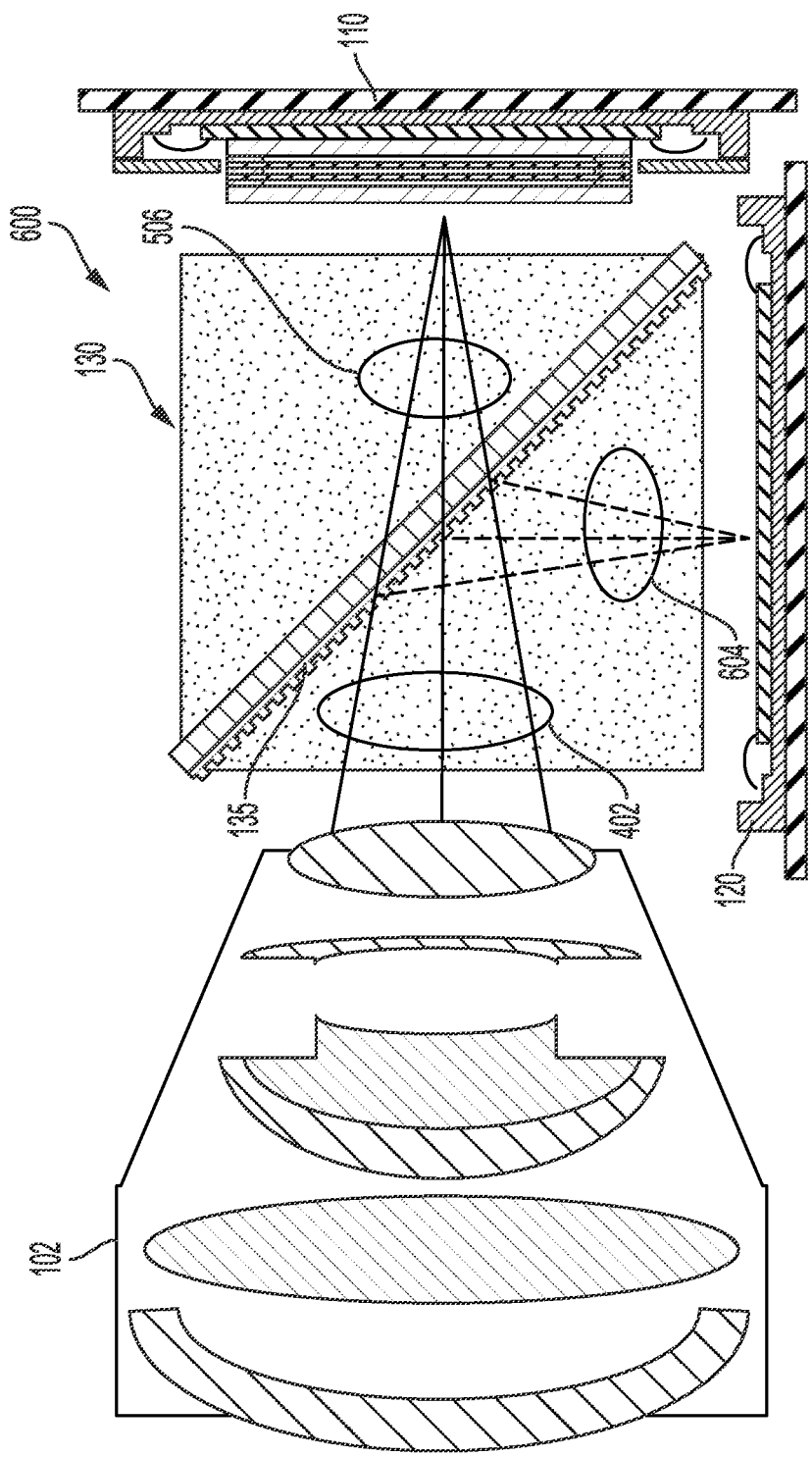
FIG. 6 is a partial block diagram of a camera system having a color imaging sensor and an image intensifying sensor operating under maximal transmittance conditions, according to one aspect of the present disclosure.

Referencing now FIGS. 4-6, FIGS. 4-6 illustrate exemplary operations of camera system 100 based on the illumination impinging on electronically controllable mirror 135. FIG. 4 illustrates an operation 400 of camera system 100 under high illumination conditions. Under high illumination conditions, light may enter camera system 100 through imaging optics 102. Light 402 conditioned by imaging optics 102 may impinge on a surface of electronically controllable mirror 135. Electronically controllable mirror 135 may receive a mirror control signal to enable it for maximal reflectance of conditioned light 402. Reflected light 404 may be directed to an active surface of second optical imaging sensor 120, which may be a CCD or CMOS color sensor. As disclosed above, it may be recognized that electronically controllable mirror 135 under maximal reflectance control may still transmit light 406 to an active surface of first optical imaging sensor 110, although the transmitted light 406 may represent a small amount of the light impinging on the surface of electronically controllable mirror 135.

FIG. 5 illustrates an operation 500 of camera system 100 under medium illumination conditions. Under medium illumination conditions, light may enter camera system 100 through imaging optics 102. Light 402 conditioned by imaging optics 102 may impinge on a surface of electronically controllable mirror 135. Electronically controllable mirror 135 may receive a mirror control signal to enable it to reflect a portion and transmit a portion of conditioned light 402. Reflected light 404 may be directed to an active surface of second optical imaging sensor 120, which may be a CCD or CMOS color sensor. Transmitted light 506 be directed to an active surface of first optical imaging sensor 110, which may be an image intensifying sensor.

FIG. 6 illustrates an operation 600 of camera system 100 under low illumination conditions. Under low illumination conditions, light may enter camera system 100 through imaging optics 102. Light 402 conditioned by imaging optics 102 may impinge on a surface of electronically controllable mirror 135. Electronically controllable mirror 135 may receive a mirror control signal to enable it to transmit maximum conditioned light 402. Transmitted light 506 be directed to an active surface of first optical imaging sensor 110, which may be an image intensifying sensor. As disclosed above, it may be recognized that electronically controllable mirror 135 under maximal transmittance control, may still reflect light 604 to an active surface of second optical imaging sensor 120, although the reflected light 604 may represent a small amount of the light impinging on the surface of electronically controllable mirror 135.

As discussed above, the relative placement of an image intensifying sensor and a CCD or CMOS color sensor with respect to electronically controllable mirror 135 may be interchanged. Thus, first optical imaging sensor 110 may be a CCD or CMOS color sensor. In this configuration, FIG. 6 may then relate to a high illumination condition in which electronically controllable mirror 135 transmits maximum conditioned light 402 to the CCD or CMOS color sensor. Similarly, second optical imaging sensor 120 may be an image intensifying sensor. In this configuration, FIG. 4 may then relate to a low illumination condition in which electronically controllable mirror 135 reflects maximum conditioned light 402 to the image intensifying sensor.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

As used herein, the terms "about," "approximately," "substantially," "generally," and the like mean plus or minus 10% of the stated value or range. In addition, as used herein, the singular forms "a," "an" and "the" are intended to include the plural forms as well, unless the context clearly indicates otherwise. The term "and/or" includes any and all combinations of one or more of the associated listed items. For example, reference to "a feature" includes a plurality of such "features." The term "and/or" used in the context of "X and/or Y" should be interpreted as "X," or "Y," or "X and Y".

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The illustrated embodiments described in the detailed description, drawings, and claims are not meant to be limiting. Other embodiments may be used, and other changes may be made, without departing from the spirit or scope of the subject matter presented herein. Additionally, particular aspects of each embodiment may also be used in conjunction with other embodiments of the present disclosure and thus, the disclosed embodiments may be combined as understood in the art. It will be readily understood that the aspects of the present disclosure, as generally described herein, and illustrated in the figures, can be arranged, substituted, combined, separated, and designed in a wide variety of different configurations, all of which are explicitly contemplated herein.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples). Further, as utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is to be understood that depicted architectures of different components contained within, or connected with, different other components are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated also can be viewed as being "operably connected," or "operably coupled," to each other to achieve the desired functionality, and any two components capable of being so associated also can be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components, and/or electrically interacting components, and/or electrically interactable components, and/or optically interacting components, and/or optically interactable components.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Further, while several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

For conciseness and clarity of disclosure, selected aspects of the foregoing disclosure have been shown in block diagram form rather than in detail. Some portions of the detailed descriptions provided herein may be presented in terms of instructions that operate on data that is stored in one or more computer memories or one or more data storage devices (e.g. floppy disk, hard disk drive, solid state drives, Compact Disc (CD), Digital Video Disk (DVD), or digital tape). Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

Unless specifically stated otherwise as apparent from the foregoing disclosure, it is appreciated that, throughout the foregoing disclosure, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various forms of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. In one form, several portions of the subject matter described herein may be implemented via an application specific integrated circuits (ASIC), a field programmable gate array (FPGA), a digital signal processor (DSP), or other integrated formats. However, those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In other instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present disclosure have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "one form," or "a form" means that a particular feature, structure, or characteristic described in connection with the aspect is included in at least one aspect. Thus, appearances of the phrases "in one aspect," "in an aspect," "in one form," or "in an form" in various places throughout the specification are not necessarily all referring to the same aspect. Furthermore, the particular features, structures or characteristics may be combined in any suitable manner in one or more aspects.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A camera system comprising:
    a first intensified optical imaging sensor that provides first intensified optical imaging sensor data under low illumination conditions;
    a second color optical imaging sensor that provides second color optical imaging sensor data under high illumination conditions;
    an electronically controllable mirror system comprising:
        an electronically controllable mirror disposed at a fixed position relative to the first intensified optical imaging sensor and to the second color optical imaging sensor; and
        a mirror controller to control a mirror control signal applied to the electronically controllable mirror,
        wherein the electronically controllable mirror system, based on the mirror control signal, transmits a first portion of incident light through the electronically controllable mirror to the first intensified optical imaging sensor, and reflects a second portion of the incident light by the electronically controllable mirror to the second color optical imaging sensor; and
    a camera system controller comprising:
        a processor; and
        a memory unit, wherein the memory unit comprises instructions that, when executed by the processor, cause the processor to:
            receive the first intensified optical imaging sensor data from the first intensified optical imaging sensor;
            receive the second color optical imaging sensor data from the second color optical imaging sensor; and
            merge the first intensified optical imaging sensor data and the second color optical imaging sensor data into enhanced color imaging data.

2. The camera system of claim 1, wherein the memory unit further comprises instructions that, when executed by the processor, further cause the processor to:
    calculate imaging data from characteristics of the first intensified optical imaging sensor data and characteristics of the second color optical imaging sensor data.

3. The camera system of claim 2, wherein the memory unit further comprises instructions that, when executed by the processor, further causes the processor to transmit the imaging data to an image display system, a data storage system, or an external system.

4. The camera system of claim 2, wherein the memory unit further comprises instructions that, when executed by the processor, further cause the processor to:
transmit a mirror controller regulator signal to the mirror controller based at least in part on the first intensified optical imaging sensor data or the second color optical imaging sensor data.

5. The camera system of claim 2, wherein the memory unit further comprises instructions that, when executed by the processor, further causes the processor to:
receive a manual operation signal from a user-operated input device; and
transmit a manual mirror controller regulator signal to the mirror controller.

6. The camera system of claim 2, wherein the memory unit further comprises instructions that, when executed by the processor, further causes the processor to:
receive an input signal from an external device; and
transmit an input data mirror controller regulator signal to the mirror controller.

7. The camera system of claim 1, wherein the electronically controllable mirror comprises a surface spatially fixed with respect to a body of the electronically controllable mirror to receive the incident light.

8. The camera system of claim 1, wherein the electronically controllable mirror is continuously adjustable between a maximum percent transmittance state and a minimum percent transmittance state, and
wherein the electronically controllable mirror is continuously adjustable between a maximum percent reflectance state and a minimum percent reflectance state.

9. The camera system of claim 8, wherein the mirror control signal is continuously variable between a mirror control signal value corresponding to the minimum percent transmittance state and a mirror control signal value corresponding to the maximum percent transmittance state.

10. The camera system of claim 8, wherein the mirror control signal is continuously variable between a mirror control signal value corresponding to the minimum percent reflectance state and a mirror control signal value corresponding to the maximum percent reflectance state.

11. The camera system of claim 1, wherein the mirror control signal comprises a mirror control voltage.

12. The camera system of claim 1, wherein the first intensified optical imaging sensor is capable of providing the first optical imaging data under illumination of between about $1\times10^{-6}$ foot-candles and about $1\times10^{-3}$ foot-candles and wherein the second color optical imaging sensor is capable of providing the second optical imaging data under illumination of between about $1\times10^{-3}$ foot-candles and about $1\times10^{3}$ foot-candles.

13. A method of producing color images, the method comprising:
receiving incident light on a surface of an electronically controllable mirror;
controlling, by a camera system controller, the electronically controllable mirror to direct a first portion of the incident light to impinge on a first intensified optical imaging sensor and to direct a second portion of the incident light to impinge on a second color optical imaging sensor;
receiving, by the camera system controller, first intensified optical imaging sensor data from the first intensified optical imaging sensor under low illumination conditions;
receiving, by the camera system controller, second color optical imaging sensor data from the second color optical imaging sensor under high illumination conditions;
merging the first intensified optical imaging sensor data and the second color optical imaging sensor data into enhanced color imaging data;
wherein the electronically controllable mirror is disposed at a fixed position relative to the first intensified optical imaging sensor and to the second color optical imaging sensor, and
wherein the surface of the electronically controllable mirror is spatially fixed with respect to a body of the electronically controllable mirror.

14. The method of claim 13, wherein controlling, by the camera system controller, the electronically controllable mirror comprises controlling the electronically controllable mirror based at least in part on the first intensified optical imaging sensor data or the second color optical imaging sensor data.

15. The method of claim 13, further comprising:
calculating, by the camera system controller, imaging data from the first optical imaging sensor data and the second optical imaging sensor data, wherein the imaging data comprises characteristics of the first intensified optical imaging sensor data and characteristics of the second color optical imaging sensor data.

16. The method of claim 15, further comprising, transmitting, by the camera system controller, the imaging data to an image display system, an image data storage system, or an external device.

17. The method of claim 13, wherein the first intensified optical imaging sensor provides the first optical imaging data under illumination of between about $1\times10^{-6}$ foot-candles and about $1\times10^{-3}$ foot-candles and wherein the second color optical imaging sensor provides the second optical imaging data under illumination of between about $1\times10^{3}$ foot-candles and about $1\times10^{3}$ foot-candles.

* * * * *